United States Patent
Kang et al.

(10) Patent No.: US 12,106,905 B2
(45) Date of Patent: Oct. 1, 2024

(54) CERAMIC ELECTRONIC COMPONENT INCLUDING BONDING LAYER BETWEEN BODY AND SINTERED EXTERNAL ELECTRODE

(71) Applicant: SAMSUNG ELECTRO-MECHANICS CO., LTD., Suwon-si (KR)

(72) Inventors: Bum Suk Kang, Suwon-si (KR); Su Jin Lee, Suwon-si (KR); Dae Woo Yoon, Suwon-si (KR); Da Mi Kim, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 60 days.

(21) Appl. No.: 17/707,390

(22) Filed: Mar. 29, 2022

(65) Prior Publication Data

US 2023/0162921 A1 May 25, 2023

(30) Foreign Application Priority Data

Nov. 22, 2021 (KR) ........................ 10-2021-0161325

(51) Int. Cl.
| | | |
|---|---|---|
| *H01G 4/30* | (2006.01) | |
| *H01G 4/008* | (2006.01) | |
| *H01G 4/012* | (2006.01) | |
| *H01G 4/12* | (2006.01) | |
| *H01G 4/232* | (2006.01) | |

(52) U.S. Cl.
CPC ............... *H01G 4/30* (2013.01); *H01G 4/008* (2013.01); *H01G 4/012* (2013.01); *H01G 4/12* (2013.01); *H01G 4/2325* (2013.01)

(58) Field of Classification Search
CPC ........ H01G 4/30; H01G 4/008; H01G 4/2325; H01G 4/1209
See application file for complete search history.

(56) References Cited

U.S. PATENT DOCUMENTS

| | | | | |
|---|---|---|---|---|
| 2009/0303655 A1* | 12/2009 | Ogawa | ..................... | H01G 4/30 29/25.42 |
| 2013/0182369 A1* | 7/2013 | Jeon | ......................... | H01G 4/30 156/89.12 |
| 2013/0201600 A1 | 8/2013 | Nishisaka et al. | | |
| 2013/0279073 A1* | 10/2013 | Nishisaka | ................ | H01G 4/30 361/301.4 |
| 2017/0287640 A1* | 10/2017 | Choi | ........................ | H01G 4/30 |

(Continued)

FOREIGN PATENT DOCUMENTS

| | | | |
|---|---|---|---|
| JP | H04-328814 A | 11/1992 | |
| JP | H06-224073 A | 8/1994 | |

(Continued)

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A ceramic electronic component includes a body including a dielectric layer and an internal electrode; an external electrode disposed on the body; and a bonding layer disposed between the body and the external electrode. The bonding layer has a thickness less than a thickness of the external electrode.

12 Claims, 7 Drawing Sheets

(56) References Cited

U.S. PATENT DOCUMENTS

| | | | |
|---|---|---|---|
| 2018/0190433 A1* | 7/2018 | Cho | H01G 4/012 |
| 2019/0019624 A1* | 1/2019 | Oh | H01G 13/006 |
| 2019/0103225 A1* | 4/2019 | Han | H01G 4/2325 |
| 2019/0157006 A1* | 5/2019 | Han | H01G 4/008 |
| 2020/0082983 A1* | 3/2020 | Kim | H01G 4/012 |
| 2020/0105472 A1* | 4/2020 | Song | H01G 4/236 |
| 2020/0118754 A1* | 4/2020 | Seo | H01G 4/2325 |
| 2022/0102062 A1* | 3/2022 | Wakabayashi | H01G 4/30 |

FOREIGN PATENT DOCUMENTS

| | | | |
|---|---|---|---|
| JP | 2007073882 A | * | 3/2007 |
| JP | 2013-179267 A | | 9/2013 |

* cited by examiner $$SiH_2NH + 2H_2O \rightarrow SiO_2 + NH_3(gas) + 2H_2(gas)$$

CERAMIC ELECTRONIC COMPONENT INCLUDING BONDING LAYER BETWEEN BODY AND SINTERED EXTERNAL ELECTRODE

CROSS-REFERENCE TO RELATED APPLICATIONS

This application claims benefit of priority to Korean Patent Application No. 10-2021-0161325 filed on Nov. 22, 2021 in the Korean Intellectual Property Office, the disclosure of which is incorporated herein by references in its entirety.

TECHNICAL FIELD

The present disclosure relates to a ceramic electronic component, and more particularly, to a multilayer ceramic capacitor.

BACKGROUND

Recently, it has been necessary to develop an ultra-small sized MLCC in accordance with lightweight, miniaturized electronic products, and various material processing techniques for such MLCCs have been developed. In other words, a great deal of research into the development of ultra-small MLCC products having high reliability has been conducted.

Most external electrodes of an MLCC may be formed by a dipping method. In this case, an external electrode should be baked. For example, a method of applying a paste for an external electrode to a ceramic body by dipping, and baking the ceramic body may be used.

However, in this case, the strain may be focused on a triple point of the corner formed while the external electrode is reduced, such that the strength of the ceramic body may be reduced, which may cause radial cracks.

Also, due to the properties of an external electrode which reduces in the three-dimensional direction differently from an internal electrode, the edge portion may inevitably have a reduced thickness, and accordingly, the external electrode may not be free from rheological properties of a binder.

SUMMARY

An aspect of the present disclosure is to provide a ceramic electronic component which may, by reducing a heat treatment temperature, address radial cracks.

Another aspect of the present disclosure is to provide a ceramic electronic component which may be, by substantially uniformly implementing a thickness of an external electrode, free from rheological properties of a binder.

Another aspect of the present disclosure is to provide a ceramic electronic component which may reduce dependency on a temperature in implementation of capacitance as implementation of density is almost completed.

According to an aspect of the present disclosure, a bonding layer may be formed on a separately manufactured external electrode, and may be thermally bonded to a ceramic body using the bonding layer.

For example, a ceramic electronic component includes a body including a dielectric layer and an internal electrode; an external electrode disposed on the body; and a bonding layer disposed between the body and the external electrode. The bonding layer has a thickness less than a thickness of the external electrode.

For example, a ceramic electronic component includes a body including a dielectric layer and an internal electrode; and an external electrode disposed on the body, wherein the external electrode includes copper and glass. A region from the internal surface of the external electrode to a point of the external electrode having a thickness of 7 µm is defined as a first region, a region from the point of the external electrode having a thickness of 7 µm to an external surface of the external electrode is defined as a second region, and an area ratio of glass to copper in the second region is less than an area ratio of glass to copper in the first region, on a cross-sectional surface taken in a length direction and a thickness direction.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Hereinafter, embodiments of the present disclosure will be described as follows with reference to the attached drawings.

In the accompanying drawings, some elements may be exaggerated, omitted or briefly illustrated, and the sizes of the elements do not necessarily reflect the actual sizes of these elements.

Figure 1:
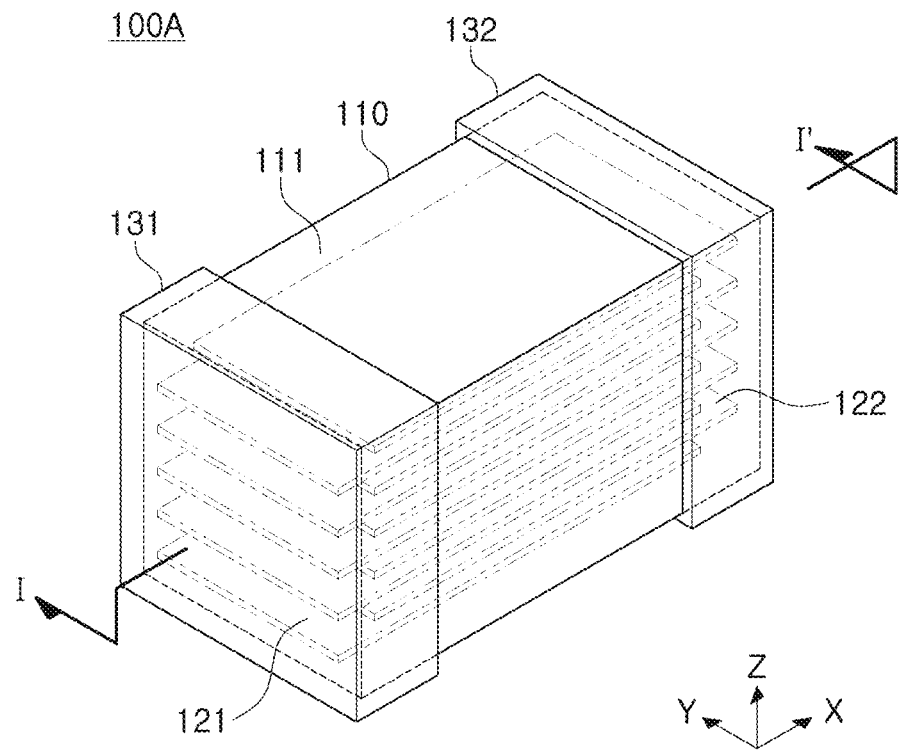
FIG. 1 is a perspective diagram illustrating a ceramic electronic component according to an example embodiment of the present disclosure.

FIG. 1 is a perspective diagram illustrating a ceramic electronic component according to an example embodiment.

Figure 2:
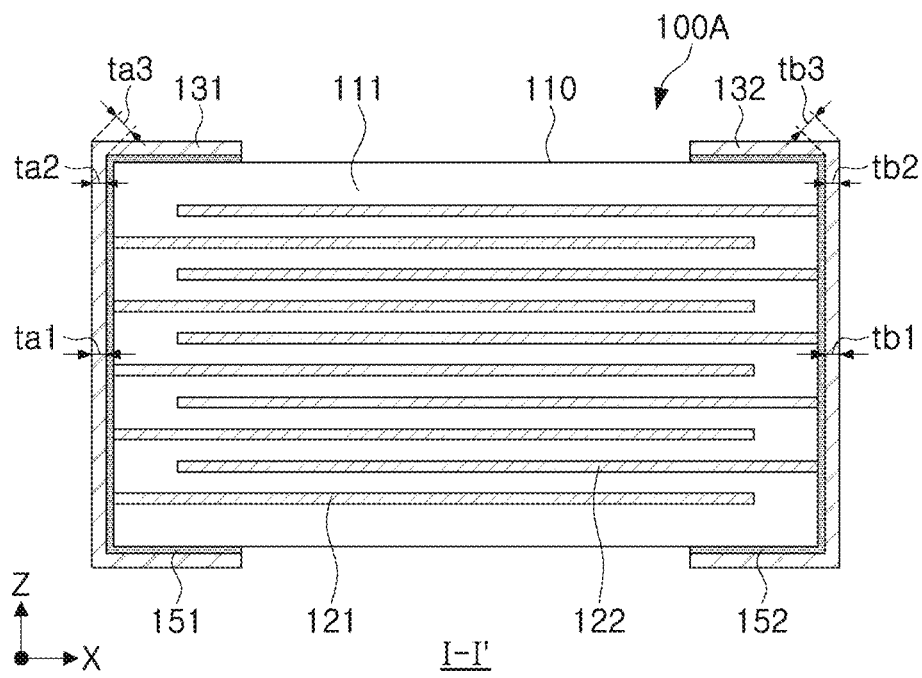
FIG. 2 is a cross-sectional diagram taken along line I-I' in FIG. 1.

FIG. 2 is a cross-sectional diagram taken along line I-I' in FIG. 1.

Referring to the drawings, a ceramic electronic component 100A according to an example embodiment may include a body 110 including a dielectric layer 111 and internal electrodes 121 and 122, external electrodes 131 and 132 disposed on the body 110, and bonding layers 151 and 152 disposed between the body 110 and the external electrodes 131 and 132. For example, the bonding layers 151 and 152 may present in the form of a thin film on the interfacial surface between the body 110 and the external electrodes 131 and 132.

The body 110 may have a shape similar to a rectangular parallelepiped having a first surface (or a left-side surface) and a second surface (or a right-side surface) opposing each other with respect to the X-direction (or a length direction), a third surface (or a front-side surface) and a fourth surface (or a rear-side surface) opposing each other with respect to the Y-direction (or a width direction), and a fifth surface (or an upper surface) and a sixth surface (or a lower surface opposing each other with respect to the Z-direction (or a thickness direction). If desired, the angular shape of the body 110, that is, for example, a corner portion thereof, may be polished to be rounded by a polishing process. If desired, the angular shape of the external electrodes 131 and 132, that is, for example, a corner portion thereof, may have a rounded shape, and may have a concave shape and/or a convex shape in partial regions.

In the body 110, the dielectric layer 111 and internal electrodes 121 and 122 may be alternately laminated. The plurality of dielectric layers 111 may be in a baked and/or sintered state, and a boundary between the adjacent dielectric layers 111 may be integrated with each other such that the boundary may not be distinct without using a scanning electron microscope (SEM).

The dielectric layer 111 may be formed by baking a ceramic green sheet including ceramic powder, an organic solvent, and an organic binder. The ceramic powder may be a material having a high dielectric constant, and a barium titanate ($BaTiO_3$) material or a strontium titanate ($SrTiO_3$) material may be used, but an example embodiment thereof is not limited thereto. As such, the dielectric layer 111 may include a ferroelectric material, but an example embodiment thereof is not limited thereto. A plurality of the dielectric layer 111 may be laminated and sintered, and may be integrated with each other such that a boundary between the layers adjacent to each other may not be visually distinct.

The internal electrodes 121 and 122 may be formed of a conductive paste including a conductive metal. For example, the internal electrodes 121 and 122 may be printed by printing a conductive paste on the ceramic green sheet forming the dielectric layer 111 through a printing method such as a screen printing method or a gravure printing method. By alternately laminating and baking the ceramic green sheets on which the internal electrodes 121 and 122 are printed, the above-described body 110 may be formed. The conductive metal may include nickel (Ni), copper (Cu), palladium (Pd), and/or alloys thereof, but an example embodiment thereof is not limited thereto.

The internal electrodes 121 and 122 may include a plurality of first internal electrodes 121 and a plurality of second internal electrodes 122. The plurality of first and second internal electrodes 121 and 122 may be separated from each other with the dielectric layer 111 interposed therebetween. The plurality of first and second internal electrodes 121 and 122 may be alternately laminated in the Z-direction of the body 110, may be exposed to the first and second surfaces of the body 110, respectively, and as the first and second bonding layers 151 and 152 are present as thin films, the plurality of first and second internal electrodes 121 and 122 may be connected to the first and second external electrodes 131 and 132, respectively. That is, capacitance may be implemented. However, an example embodiment thereof is not limited thereto, and the plurality of first and second internal electrodes 121 and 122 may be disposed differently. For example, the plurality of first and second internal electrodes 121 and 122 may be alternately laminated in the Y-direction of the body 110 and may be exposed to the first and second surfaces of the body 110, respectively, but an example embodiment thereof is not limited thereto.

The external electrodes 131 and 132 may include a first external electrode 131 and a second external electrode 132. The first and second external electrodes 131 and 132 may be disposed on the first and second bonding layers 151 and 152 on both ends of the body 110 in the X-direction, respectively. For example, the first external electrode 131 may be disposed on the first surface of the body 110 and may partially extend to the third to sixth surfaces of the body 110. Also, the second external electrode 132 may be disposed on the second surface of the body 110 and may partially extend to the third to sixth surfaces of the body 110.

However, an example embodiment thereof is not limited thereto, and the first and second external electrodes 131 and 132 may also be disposed differently. For example, the first external electrode 131 may be disposed on the first surface of the body 110 and may partially extend only to the fifth and/or sixth surface of the body 110. Also, the second external electrode 132 may be disposed on the second surface of the body 110 and may partially extend only to the fifth and/or sixth surface of the body 110. Also, the first and second external electrodes 131 and 132 may be disposed in other various manners.

The external electrodes 131 and 132 may have a substantially constant thickness. The substantially constant thickness may refer to the configuration in which the thickness may be substantially the same at any point, and may include the example in which the thickness may be entirely or almost the same, such that the configuration of thickness may be determined based on process errors, positional deviation, and errors in measurement. The above configuration may be implemented by separately manufacturing and baking the external electrodes 131 and 132.

For example, the external electrodes 131 and 132 may be formed by injecting a paste for forming an external electrode in a casting mold and performing forming, and independently baking the paste, and thereafter, the bonding layers 151 and 152 may be coated on the external electrodes 131 and 132, and the external electrodes 131 and 132 may be bonded by thermal bonding the external electrodes 131 and 132 to the body 110 under a heat treatment condition of 400° C. to 500° C. using the bonding layers 151 and 152 as interfacial surfaces. Accordingly, the thickness of the external electrodes 131 and 132 on the body 110 may be substantially constant. If desired, the bonding layers 151 and 152 may be coated on the external surface of the body 110, and the above-described thermal bonding may be performed. As described above, the external electrodes 131 and 132 may be separately baked to implement a desired shape, such that the manufactured external electrodes 131 and 132 may be assembled to the body 110. Accordingly, the external electrodes may be free from the rheological properties of the binder even while the thickness is substantially constant. Also, as the heat treatment temperature decreases by about 200° C. to 350° C. than in a general method, the risk of radial cracks caused by increasing the number of laminated layers of a model having high-capacitance may be addressed. Also, differently from a general method, the implementation of density may be almost completed, such that dependency on a temperature in implementation of capacitance may be reduced.

In this respect, on the cross-sectional surface in the X-direction and the Z-direction, a thickness ta1 of the first external electrode 131 in a center of the first surface of the body 110 may be substantially the same as a thickness ta2 on an end on the first surface of the body 110. For example, ta1/ta2 may be approximately 0.9 to 1.1 or 0.95 to 1.05. Also, the thickness tb1 of the second external electrode 132 on the center of the second surface of the body 110 may be substantially the same as the thickness tb2 on the end of the second surface of the body 110. For example, tb1/tb2 may be approximately 0.9 to 1.1 or 0.95 to 1.05. The thicknesses may be roughly measured using SEM images on the cross-sectional surface taken in the X-direction and Z-direction. Other measurement methods and/or tools appreciated by one of ordinary skill in the art, even if not described in the present disclosure, may also be used.

In this respect, on the cross-sectional surface in the X-direction and the Z-direction, the thickness ta1 of the first external electrode 131 on the center of the first surface of the body 110 may be substantially the same as the thickness ta3 on the corner on which the first surface is connected to the fifth surface or the sixth surface. For example, ta1/ta3 may be approximately 0.9 to 1.1 or 0.95 to 1.05. Also, the thickness tb1 of the second external electrode 132 on the center of the second surface of the body 110 may be substantially the same as the thickness tb3 on the corner on which the second surface of the body 110 is connected to the fifth surface or the sixth surface. For example, tb1/tb3 may be approximately 0.9 to 1.1 or 0.95 to 1.05. The thicknesses may be roughly measured using SEM images on the cross-sectional surface taken in X-direction and Z-direction.

The cross-sectional surface in the X-direction and the Z-direction may refer to the cross-sectional shape of when the object is vertically cut out in the X-direction and the Z-direction, or the cross-sectional shape of when the object is side-viewed in the X-direction and the Z-direction.

The external electrodes 131 and 132 may include a conductor, and the conductor may include copper (Cu), nickel (Ni), palladium (Pd), platinum (Pt), gold (Au), silver (Ag), lead (Pb) and/or alloys thereof. The external electrodes 131 and 132 may be formed in the same manner as described above using a paste including such a conductor, for example, copper (Cu). To prevent reduction changes and side-effects caused by decomposition of organic matter during drying and baking processes after a paste is injected into a casting mold, the content of the solvent and organic matter included in the paste to a minimum may need to be reduced. Also, after the thin film coating layer is formed, an interfacial surface portion including silica and/or glass having a low-melting point is formed on the interfacial surface between the external electrodes 131 and 132 and the body 110 through thermal bonding, and the content of glass may be reduced as compared to the content of copper (Cu).

If desired, a plating layer including a nickel layer, a tin layer, or a combination thereof may be further disposed on the external electrodes 131 and 132. For example, a nickel layer and a tin layer may be disposed in order on the first and second external electrodes 131 and 132, respectively. The plating layer may be formed by a generally used plating process such as electrolytic plating or electroless plating, and a plating method is not limited to the above examples.

The bonding layers 151 and 152 may include a first bonding layer 151 and a second bonding layer 152. The first and second bonding layers 151 and 152 may be disposed on both ends of the body 110 in the X-direction, respectively. For example, the first bonding layer 151 may be disposed between the first surface of the body 110 and the first external electrode 131, and a portion thereof may extend to regions between the third to sixth surfaces of the body 110 and the first external electrode 131. Also, the second bonding layer 152 may be disposed in a region between the second surface of the body 110 and the second external electrode 132, and a portion thereof may extend to regions between the third to sixth surfaces of the body 110 and the second external electrode 132.

However, an example embodiment thereof is not limited thereto, and the first and second bonding layers 151 and 152 may be disposed differently. For example, the first bonding layer 151 may be disposed between the first surface of the body 110 and the first external electrode 131, and a portion thereof may extend only to regions between the fifth and/or sixth surface of the body 110 and the second electrode 131. Also, the second bonding layer 152 may be disposed between the second surface of the body 110 and the second external electrode 132, and a portion thereof may extend only to regions between the fifth and/or sixth surface of the body 110 and the second external electrode 132. Also, the first and second bonding layers 151 and 152 may be disposed in various other manners.

The bonding layers 151 and 152 may be directly disposed on at least one surface of the body 110. For example, the first bonding layer 151 may be disposed directly on the first surface of the body 110, and a portion thereof may extend directly to at least one of the third to sixth surfaces of the body 110. Also, the second bonding layer 152 may be disposed directly on the second surface of the body 110, and a portion thereof may extend directly to at least one of the third to sixth surfaces of the body 110. The configuration in which one of the bonding layers may be directly disposed on one surface of the body may indicate that no element may be provided between the bonding layer and one surface of the body.

The bonding layers 151 and 152 may have a thickness less than that of the external electrodes 131 and 132. For example, the first bonding layer 151 may have a thickness less than that of the first external electrode 131. Also, the second bonding layer 152 may have a thickness less than that of the second external electrode 132. The comparison of thickness may be roughly determined using SEM images on the cross-sectional surface taken in X-direction and Z-direction. In this respect, the bonding layers 151 and 152 may be formed in the form of thin film coating layers before thermal bonding. The coating thickness may be controlled by controlling the concentration of the solution, and the coating thickness may be thin to implement capacitance. For example, the thickness of the coating layer may be about 1 μm or less, or about 800 nm or less, for example, about 400 nm to about 600 nm, but an example embodiment thereof is not limited thereto. By reducing the thickness as above, after thermal bonding, the external electrodes 131 and 132 may be connected to the internal electrodes 121 and 122, thereby implementing capacitance.

In this aspect, the bonding layers 151 and 152 may be present as interfacial surfaces between the external electrodes 131 and 132 and the body 110 after the thermal bonding. For example, the first bonding layer 151 may be present as an interfacial surface between the body 110 and the first external electrode 131. Also, the second bonding layer 152 may be present as an interfacial surface between the body 110 and the second external electrode 132. In particular, the boundary portion by the bonding layers 151 and 152 in the band region, that is, for example, on the third to sixth surfaces of the body 110, may be distinct.

The bonding layers 151 and 152 may include silica ($SiO_2$). For example, the bonding layers 151 and 152 may be formed by coating a paste including perhydro-polysilazane ($SiH_2NH$) on the internal sides of the external electrodes 131 and 132 separately manufactured or on the external surface of the body 110, and performing a thermal bonding process thereafter. The coating method is not limited to any particular method. Alternatively, the bonding layers 151 and 152 may include glass having a low melting point. For example, the bonding layers 151 and 152 may be formed by coating a paste including glass having a low melting point on the internal sides of the external electrodes 131 and 132 separately manufactured or on the external surface of the body 110, and performing a thermal bonding process thereafter. The coating method is not limited to any particular method. The glass having a low melting point may be glass having a melting point of 500° C. or less, such as, for example, a melting point of about 350° C. to 450° C., and various types of glass other than silica described above may be included.

Figure 3:
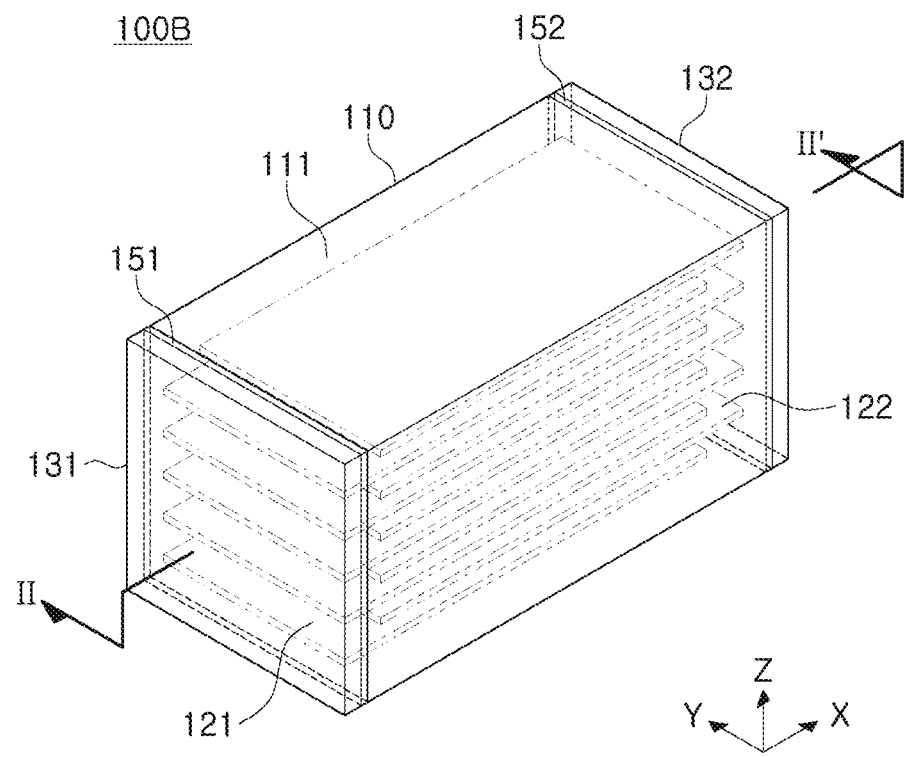
FIG. 3 is a perspective diagram illustrating a ceramic electronic component according to another example embodiment of the present disclosure.

FIG. 3 is a perspective diagram illustrating a ceramic electronic component according to another example embodiment.

Figure 4:
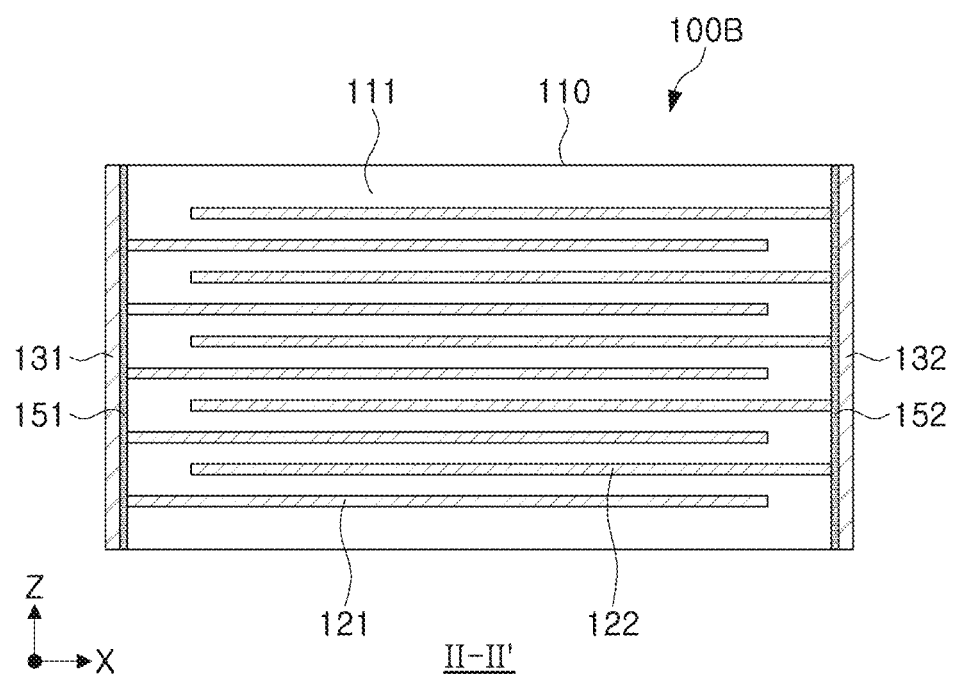
FIG. 4 is a cross-sectional diagram taken along line II-II' in FIG. 3.

FIG. 4 is a cross-sectional diagram taken along line II-II' in FIG. 3.

Referring to the drawings, a ceramic electronic component 100B according to another example embodiment may have a copper sheet shape in which the external electrodes 131 and 132 may have a substantially constant thickness. For example, the bonding layers 151 and 152 may be disposed only on the first and second surfaces of the body 110, and the external electrodes 131 and 132 may be disposed on the bonding layers 151 and 152 only on the first and second surfaces of the body 110.

The external electrodes 131 and 132 may be formed by a copper sheet transfer method. For example, a copper sheet burnt into the external electrodes 131 and 132 may be prepared, bonding layers 151 and 152 may be formed by forming a coating layer including silica and/or glass having a low melting point on one surface of the copper sheet, and thereafter, the external electrodes 131 and 132 may be formed by thermal bonding to the body 110 using the bonding layers 151 and 152 as interfacial surfaces. If desired, after the coating layer is formed on the external surface of the body 110, the separately manufactured external electrode may be thermally bonded.

The other descriptions, the descriptions with respect to the above-described ceramic electronic component 100A in the aforementioned example embodiment, may be applied to the ceramic electronic component 100B according to another example embodiment, and overlapping descriptions will not be provided.

Figure 5:
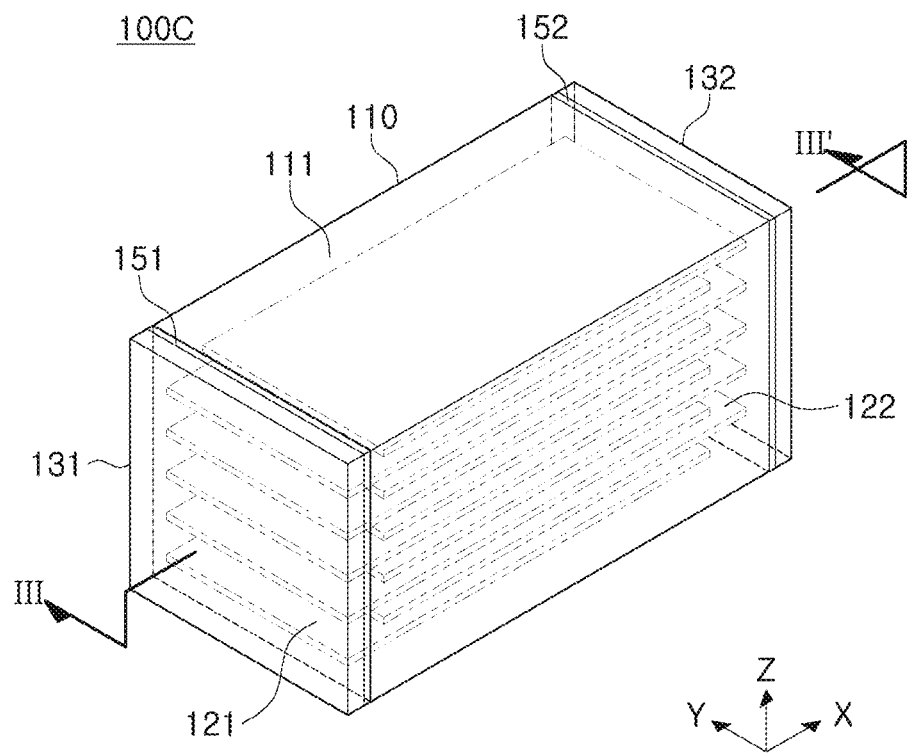
FIG. 5 is a perspective diagram illustrating a ceramic electronic component according to another example embodiment of the present disclosure.

FIG. 5 is a perspective diagram illustrating a ceramic electronic component according to another example embodiment.

Figure 6:
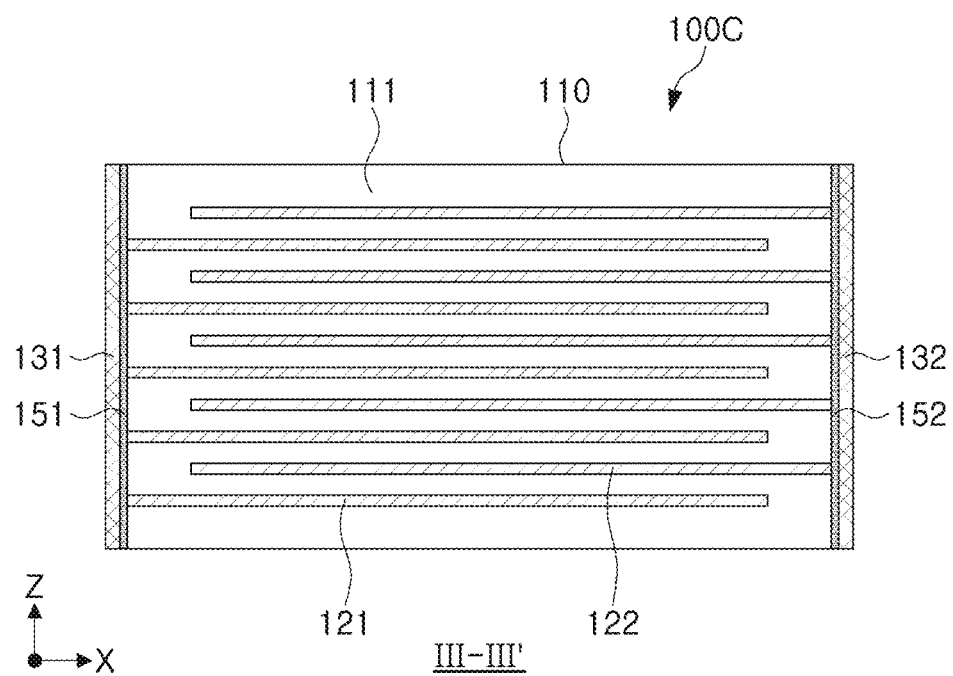
FIG. 6 is a cross-sectional diagram taken along line III-III' in FIG. 5.

FIG. 6 is a cross-sectional diagram taken along line III-III' in FIG. 5.

Referring to the drawings, the ceramic electronic component 100C according to another example embodiment may have a nickel sheet shape in which the external electrodes 131 and 132 may have a substantially constant thickness. For example, the bonding layers 151 and 152 may be disposed only on the first and second surfaces of the body 110, and the external electrodes 131 and 132 may be disposed on the bonding layers 151 and 152 only on the first and second surfaces of the body 110.

The external electrodes 131 and 132 may be formed by a nickel sheet transfer method. For example, a nickel sheet burnt into the external electrodes 131 and 132 may be prepared, and a coating layer including silica and/or glass having a low melting point may be formed on one surface of the nickel sheet, thereby forming bonding layers 151 and 152. Thereafter, the external electrodes 131 and 132 may be formed by thermal bonding to the body 110 using the bonding layers 151 and 152 as interfacial surfaces. If desired, after the coating layer is formed on the external surface of the body 110, the separately manufactured external electrode may thermally bonded.

The other descriptions, the descriptions with respect to the above-described ceramic electronic component 100A in the aforementioned example embodiment, may be applied to the ceramic electronic component 100C according to another example embodiment, and overlapping descriptions will not be provided.

Figure 7:
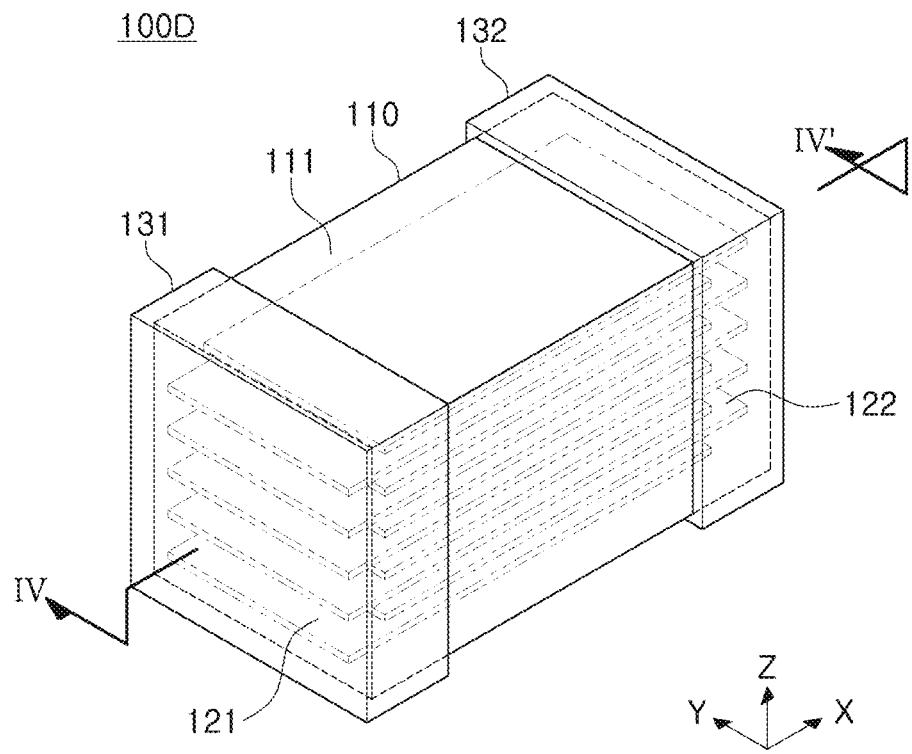
FIG. 7 is a perspective diagram illustrating a ceramic electronic component according to another example embodiment of the present disclosure.

FIG. 7 is a perspective diagram illustrating a ceramic electronic component according to another example embodiment.

Figure 8:
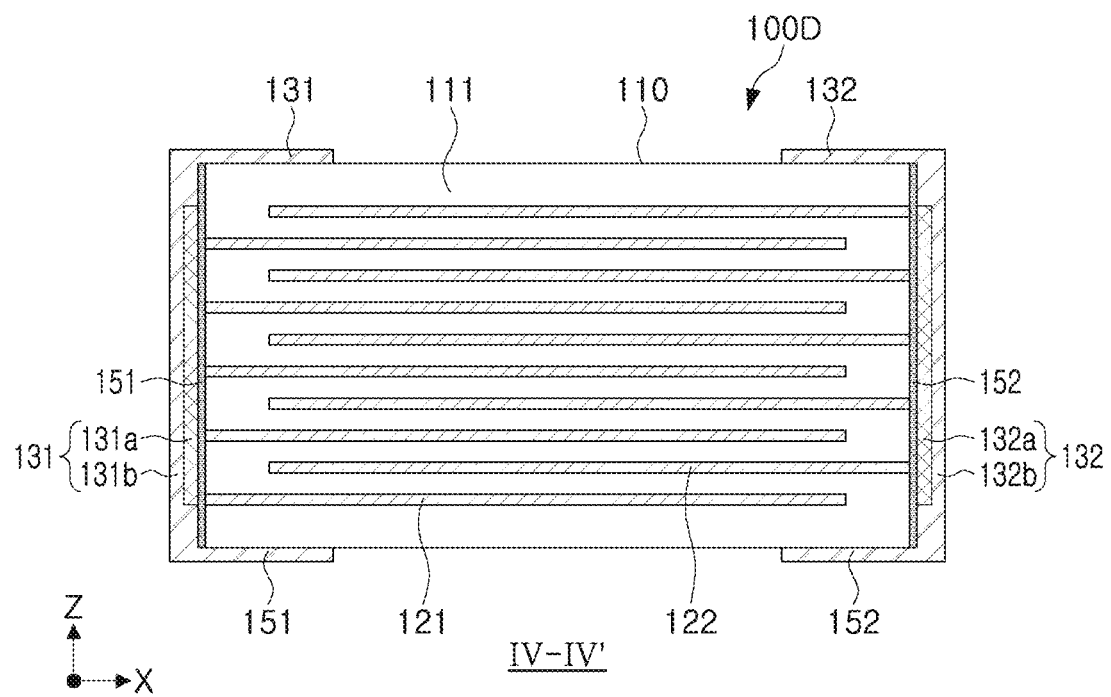
FIG. 8 is a cross-sectional diagram taken along line IV-IV' in FIG. 7.

FIG. 8 is a cross-sectional diagram taken along line IV-IV' in FIG. 7.

Referring to the drawings, in a ceramic electronic component 100D according to another example embodiment, the external electrodes 131 and 132 may include a plurality of electrode layers 131a, 131b, 132a, and 132b. For example, the first external electrode 131 may include a first electrode layer 131a disposed on the first surface of the body 110, and a second electrode layer 131b disposed on the first surface of the body 110, covering the first electrode layer 131a and partially extending to the third to sixth surfaces of the body 110. Also, the second external electrode 132 may include a third electrode layer 132a disposed on the second surface of the body 110 and a fourth electrode layer 132b disposed on the second surface of the body 110, covering the third electrode layer 132a, and partially extending to the third to sixth surfaces of the body 110. The first bonding layer 151 may be disposed in regions between the first surface of the body 110 and the first and second electrode layers 131a and 131b, respectively. The second bonding layer 152 may be disposed in regions between the second surface of the body 110 and the third and fourth electrode layers 132a and 132b, respectively. Each of the first and third electrode layers 131a and 132a may include nickel (Ni), and each of the second and fourth electrode layers 131b and 132b may include copper (Cu).

For example, the external electrodes 131 and 132 may be formed by bonding a nickel sheet to a casting mold in advance, injecting a copper paste, and drying and sintering the paste. Bonding layers 151 and 152 may be coated on at least a partial region of the separately manufactured external electrodes 131 and 132, and the external electrodes 131 and 132 may be bonded by thermal bonding to the body 110 using the bonding layers 151 and 152 as interfacial surfaces. If desired, after the coating layer is formed on the external surface of the body 110, the separately manufactured external electrode may be thermally bonded. Alternatively, after the coating layer is formed on the external surface of the body 110, the nickel sheet and the copper electrode may be thermally bonded.

The other descriptions, the descriptions with respect to the above-described ceramic electronic component 100A in the aforementioned example embodiment, may be applied to the ceramic electronic component 100D according to another example embodiment, and overlapping descriptions will not be provided.

Figure 9:
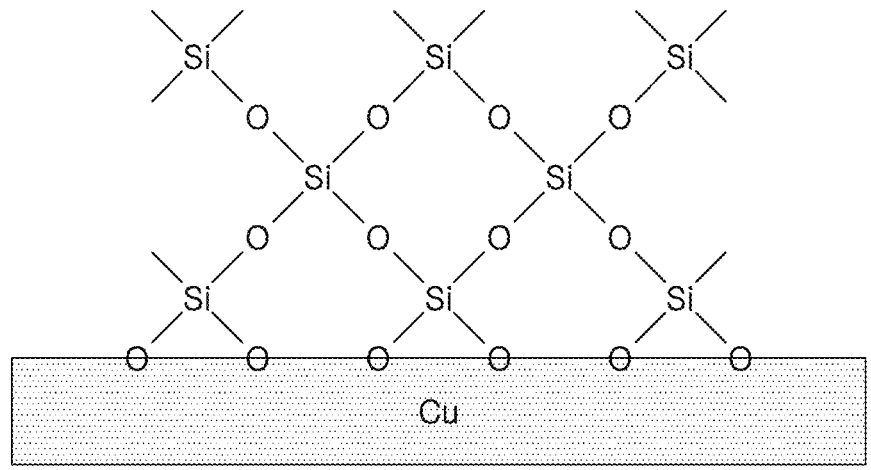
FIG. 9 is a cross-sectional diagram illustrating an example in which a silica coating layer is formed on a copper electrode.

FIG. 9 is a cross-sectional diagram illustrating an example in which a silica coating layer is formed on a copper electrode.

Referring to the drawings, the silica coating layer may be formed by applying a paste including perhydro-polysilazane (SiH$_2$NH) on the copper electrode. Perhydro-polysilazane (SiH$_2$NH) may form a silica coating layer by reacting with moisture in the atmosphere. The silica coating layer may be formed by silica connected to each other, and may be in the form of a thin film. The silica coating layer may be used as a bonding layer in thermal bonding of the copper electrodes. The silica coating layer may be present as an interfacial surface between the copper electrode and the ceramic body after thermal bonding.

Figure 10:
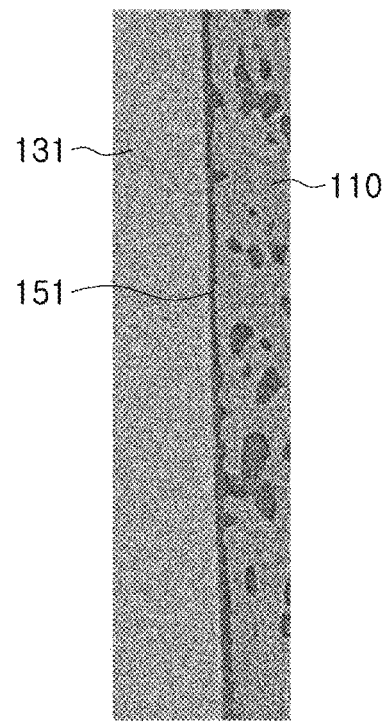
FIG. 10 is a cross-sectional image of an example in which a bonding layer is formed on an interfacial surface between a body and an external electrode, obtained by a scanning electron microscope (SEM)

FIG. 10 is a cross-sectional image of an example in which a bonding layer is formed on an interfacial surface between a body and an external electrode, obtained by a scanning electron microscope (SEM).

Referring to the drawings, when the body 110, that is, for example, an external electrode 131 formed by separately baking on a dielectric layer, that is, for example, a copper (Cu) electrode, is thermally bonded using a bonding layer 151, that is, for example, a silica and/or a low melting point glass coating layer, the bonding layer 151 may be present between the body 110 and the external electrode 131 in the form of a thin film. That is, it is indicated that the bonding layer 151 including glass may be present as an interfacial surface, which may be more distinct when the heat treatment temperature is as low as approximately 400° C.

When the heat treatment temperature gradually increases, the glass of the bonding layer 151 may gradually move toward the external electrode 131. Accordingly, the boundaries may become indistinct. In this case, glass may not be distributed in the surface region of the external electrode 131.

Figure 11:
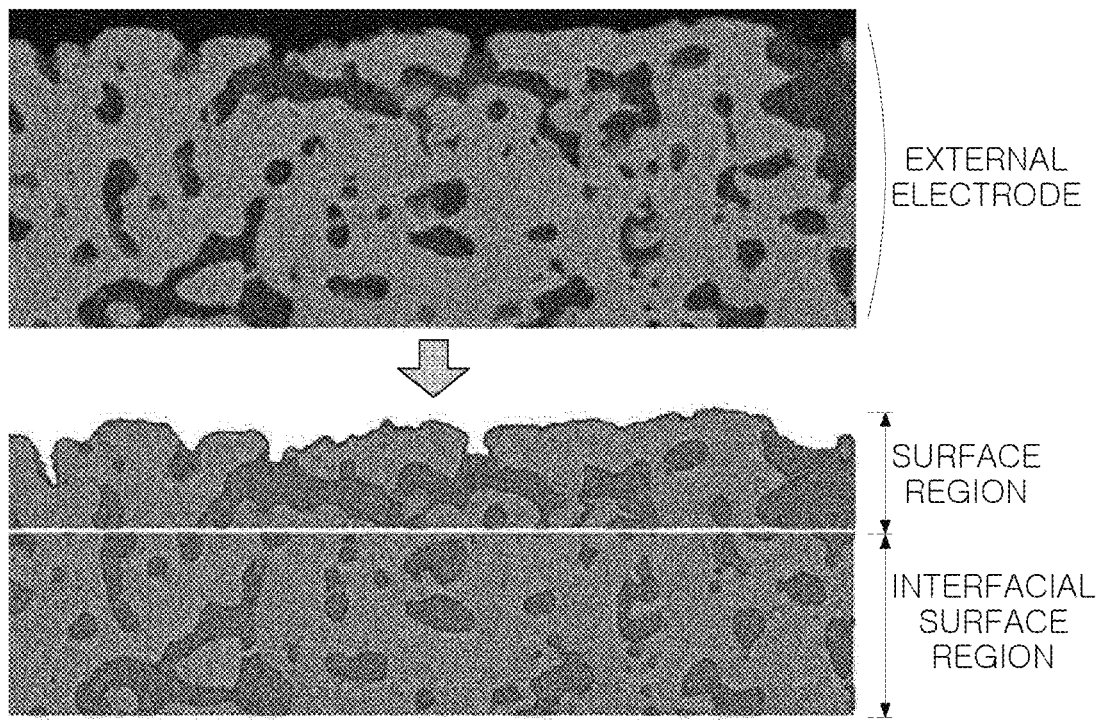
FIG. 11 is a cross-sectional image of distribution of copper and glass in an external electrode of an example in which a bonding layer is not provided, obtained by an SEM.

FIG. 11 is a cross-sectional image of distribution of copper and glass in an external electrode of an example in which a bonding layer is not provided, obtained by an SEM.

Referring to the drawings, when baking is performed together with a ceramic body in which an external electrode not including a bonding layer, that is, an external electrode configured as a copper electrode is formed by a dipping method, it may be necessary to sufficiently secure the content of glass frit in the paste for forming the external electrode to secure bonding strength with the ceramic body. Accordingly, it is indicated that after baking, glass may occupy a significant area on the interfacial surface region between the external electrode and the ceramic body and also on the surface region.

More specifically, as an example, on the cross-sectional surface in the X-direction and Z-direction, when a region from the internal surface of the external electrode connected to the ceramic body to a point of the external electrode having a thickness of 7 μm is defined as an interfacial surface region, and a region from the point of the external electrode having a thickness of 7 μm to the external surface of the external electrode is defined as a surface region, an area ratio of glass to copper in the interfacial surface region may be, for example, 38.4%, and an area ratio of glass to copper in the surface region may be, for example, 42.7%, on the cross-sectional SEM image after baking. The glass composition of the external electrode may be measured using a scanning electron microscope (SEM)-energy dispersive spectrometer (EDS) equipment under the conditions of an acceleration voltage of 10 kV and a WD of 10 mm.

As such, on the cross-sectional surface in the X-direction and the Z-direction, the area ratio of glass to copper in the surface region of the external electrode after baking may be higher than the area ratio of glass to copper in the interface region of the external electrode. For example, when the area ratio in the interface region is defined Sa and the area ratio in the surface region is defined Sb, Sb/Sa*100% may be about 70% to 120%, but an example embodiment thereof is not limited thereto.

Figure 12:
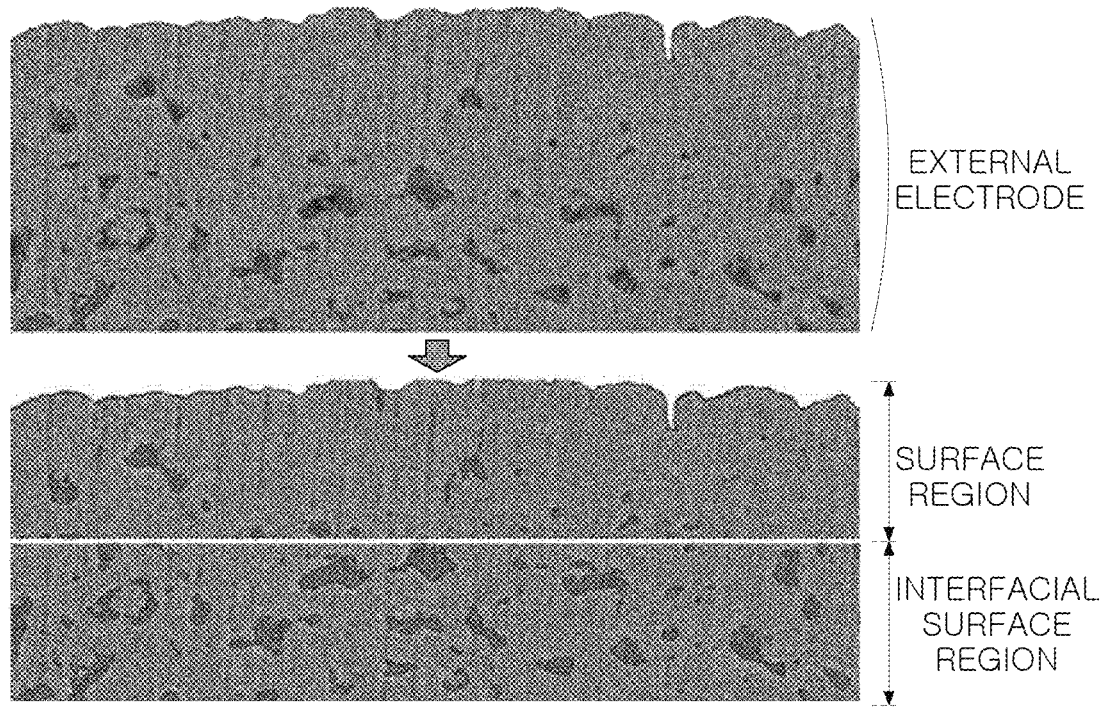
FIGS. 12 and 13 are cross-sectional images of distribution of copper and glass in an external electrode of an example in which a bonding layer is included, obtained by an SEM.
Figure 13:
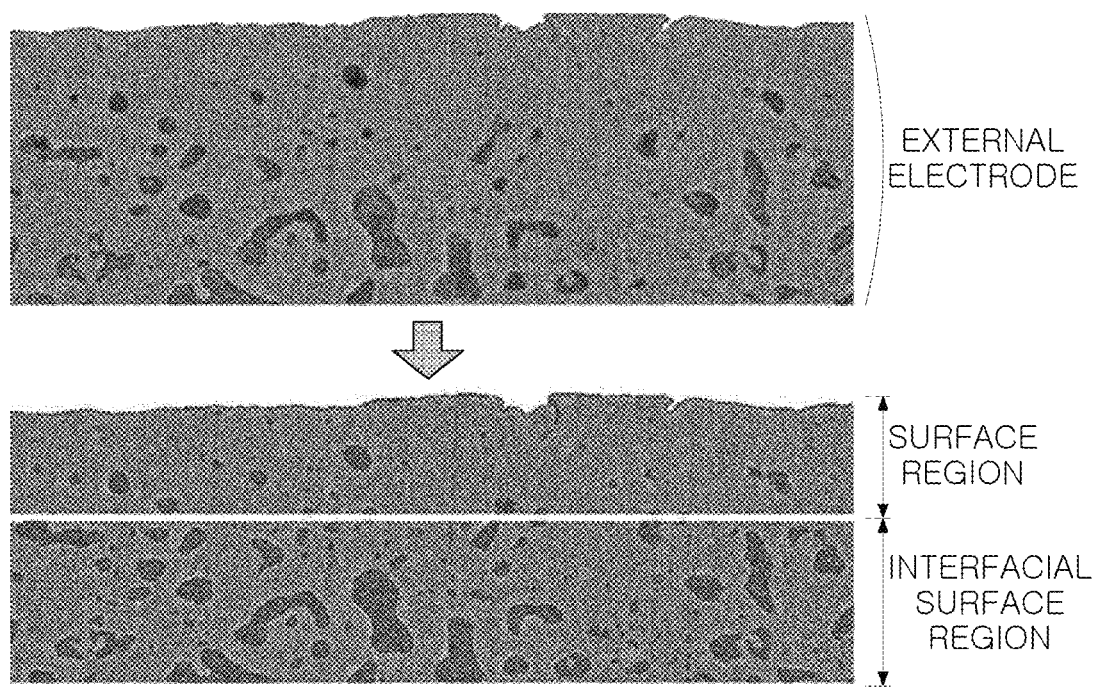

FIGS. 12 and 13 are cross-sectional images of distribution of copper and glass in an external electrode of an example in which a bonding layer is included, obtained by a SEM.

Referring to the drawings, as for an external electrode including a bonding layer, that is, for example, when the external electrode is manufactured separately as in the example embodiment, is baked, and is thermally bonded to the ceramic body using a silica coating layer or a low melting point glass boating layer, the content of glass frit may be reduced in the paste for forming the external electrode, such that the area ratio of glass to copper in the surface region of the external electrode after baking may be reduced.

More specifically, as examples, on the cross-sectional surface in the X-direction and Z-direction, when a region from the internal surface of the external electrode connected to the ceramic body to a point of the external electrode having a thickness of 7 μm is defined to as an interfacial surface region, and a region from the point of the external electrode having a thickness of 7 μm to the external surface of the external electrode is defined as a surface region, an area ratio of glass to copper in the interfacial surface region may be, for example, 10% to 20%, more specifically, 10.8% or 17.3%, and an area ratio of glass to copper in the surface region may be, for example, 3% to 5%, and more specifically, about 3.5% or 3.8%, on the cross-sectional SEM image after baking. The glass composition of the external electrode may be measured using SEM-EDS equipment under conditions of acceleration voltage of 10 kV and WD of 10 mm.

As such, on the cross-sectional surface in the X-direction and Z-direction, the area ratio of glass to copper in the surface region of the external electrode after baking may be lower than the area ratio of glass to copper in the interface region of the external electrode. For example, when the area ratio in the interface region is defined as Sa and the area ratio in the surface region is defined as Sb, Sb/Sa*100% may be about 0.01% to 35%, but an example embodiment thereof is not limited thereto. For example, when the heat treatment temperature is increased to a high temperature similarly to the general method, Sb may be close to about zero.

Experimental Example

A dielectric sheet formed of a barium titanate dielectric material and a dielectric sheet printed with a conductive paste including nickel (Ni) were laminated and compressed, and a ceramic laminate of size 0402 was prepared as a sample for experiments.

In this case, in Experimental Examples 1-8 in [Table 1] below, a paste including copper (Cu) was applied to the prepared ceramic laminate by a dipping method, and was baked and bonded at various bonding temperatures as below, thereby forming an external electrode.

Also, in Experimental Examples 9-16 in [Table 1] below, a paste including copper (Cu) was injected into a casting mold and formed, and independently baked, thereby forming an external electrode, and a silica coating layer, a thin film, was formed on the external electrode, and thermally bonded at various bonding temperatures as below, thereby forming an external electrode.

Thereafter, capacitance, radial cracks, and a C/C ratio of the manufactured MLCC sample chips were measured and listed in [Table 1] below. Here, with respect to 10,000 sample chips under the same repeated conditions, Δ refers to the example in which quality products were less than 60%, 0 refers to the example in which quality products were about 60 to 90%, and ◎ refers to the example in which quality products were about 90 to 100%.

The capacitance refers to a ratio satisfying the standard capacitance specification for each model, and for example, after 2 hours of heat treatment, the capacitance was measured using an LCR meter, and when the capacitance was included in the capacitance (unit: uF) range of the specification range, the product was determined to be a quality product.

Also, as for the radial cracks, each sample chip was laid down horizontally and the periphery of the chip was fixed with an epoxy resin, and the chip was polished using a grinder to expose the cross-sectional surface taken in the X-direction and Y-direction, the margin portion was ground by polishing to a depth of about ¼ in the Z-direction, and the frequency of cracks on the edge of the ceramic laminate was measured using SEM-EDS equipment.

Also, the C/C ratio refers to the ratio of the center thickness/corner thickness of the external electrode, and each sample chip was laid down horizontally, the periphery of the chip was fixed with an epoxy resin, the chip was polished using a grinder to expose the cross-sectional surface taken in the X-direction and Y-direction and was ground by polishing to a depth of about ½ in the Z-direction, and a thickness of each point was measured using SEM-EDS equipment.

TABLE 1

| Classification | Bonding temperature | Capacitance | Radial cracks | C/C ratio |
| --- | --- | --- | --- | --- |
| 1 | 400° C. | Δ | ◎ | 0.50 |
| 2 | 450° C. | Δ | ◎ | 0.45 |
| 3 | 500° C. | Δ | ◎ | 0.40 |
| 4 | 550° C. | Δ | ◎ | 0.38 |
| 5 | 600° C. | Δ | ◎ | 0.35 |
| 6 | 650° C. | ○ | ○ | 0.25 |
| 7 | 700° C. | ◎ | Δ | 0.20 |
| 8 | 750° C. | ◎ | Δ | 0.15 |
| 9 | 400° C. | ◎ | ◎ | 1.00 |
| 10 | 450° C. | ◎ | ◎ | 1.00 |
| 11 | 500° C. | ◎ | ◎ | 1.00 |
| 12 | 550° C. | ◎ | ◎ | 1.00 |
| 13 | 600° C. | ◎ | ◎ | 1.00 |
| 14 | 650° C. | ◎ | ◎ | 1.00 |
| 15 | 700° C. | ◎ | ◎ | 1.00 |
| 16 | 750° C. | ◎ | ◎ | 0.97 |

As indicated in [Table 1], in Experimental Examples 1-8, capacitance was insufficient when the bonding temperature as low, and radial cracks occurred when the bonding temperature as high. Also, the C/C ratio was 0.5 or less, indicating that the thickness of the external electrode was not uniform.

Differently from the above-described experimental examples, in Experimental Examples 9-16, it is indicated that there was no problem in capacitance and no radial cracks were created regardless of the heat treatment temperature. That is, since the external electrode was already baked, the diffusion coefficient of diffusion into the internal electrode was extremely low, such that radial cracks were not created even at a high temperature. Also, it is indicated that in any case, the C/C ratio was close to one such that an external electrode having a uniform thickness may be formed.

According to the aforementioned example embodiments, a ceramic electronic component which may, by reducing a heat treatment temperature, address radial cracks may be provided.

Also, a ceramic electronic component which may be, by substantially uniformly implementing a thickness of an external electrode, free from rheological properties of a binder may be provided.

Also, a ceramic electronic component which may reduce dependency on a temperature in implementation of capacitance as implementation of density is almost completed may be provided.

In the example embodiments, the terms "side portion," "side surface," and the like, may be used to refer to a surface formed taken in right/left directions with reference to a cross-section in the diagrams for ease of description, the terms "upper side," "upper portion," "upper surfaces," and the like, may be used to refer to a surface formed in an upward direction with reference to a cross-section in the diagrams for ease of description, and the terms "lower side," "lower portion," "lower surface," and the like, may be used to refer to a surface formed in a downward direction. The notion that an element is disposed on a side region, an upper side, an upper region, or a lower resin may include the configuration in which the element is directly in contact with an element configured as a reference in respective directions, and the configuration in which the element is not directly in contact with the reference element. The terms, however, may be defined as above for ease of description, and the scope of right of the example embodiments is not particularly limited to the above terms.

In the example embodiments, the term "connected" may not only refer to "directly connected" but also include "indirectly connected" by means of an adhesive layer, or the like. Also, the term "electrically connected" may include both of the case in which elements are "physically connected" and the case in which elements are "not physically connected." Further, the terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the example embodiments.

In the example embodiments, the term "example embodiment" may not refer to one same example embodiment, and may be provided to describe and emphasize different unique features of each example embodiment. The above suggested example embodiments may be implemented do not exclude the possibilities of combination with features of other example embodiments. For example, even though the features described in one example embodiment are not described in the other example embodiment, the description may be understood as relevant to the other example embodiment unless otherwise indicated.

An expression used in the singular encompasses the expression of the plural, unless it has a clearly different meaning in the context.

While the example embodiments have been illustrated and described above, it will be apparent to those skilled in the art that modifications and variations could be made without departing from the scope of the present invention as defined by the appended claims.

What is claimed is:

1. A ceramic electronic component, comprising:
   a body including a dielectric layer and an internal electrode;
   a sintered external electrode disposed on the body; and
   a bonding layer disposed on only a surface of the body in a region between the body and the sintered external electrode,
   wherein the bonding layer has a thickness less than a thickness of the sintered external electrode,
   wherein the bonding layer comprises silica ($SiO_2$) or includes glass having a melting point of 500° C. or less, and
   wherein a ratio of a thickness of the sintered external electrode at a center of the surface of the body, on which the sintered external electrode is disposed, to a thickness of the sintered external electrode at an edge of the surface of the body is 0.9 to 1.1.

2. The ceramic electronic component of claim 1, wherein the bonding layer is present as an interfacial surface between the body and the sintered external electrode.

3. The ceramic electronic component of claim 1,
   wherein the body has first and second surfaces opposing in a length direction of the body, third and fourth surfaces opposing in a width direction of the body, and fifth and sixth surfaces opposing in a thickness direction of the body, and
   wherein the internal electrodes include a plurality of first and second internal electrodes alternately disposed in the thickness direction and alternately exposed to the first and second surfaces of the body.

4. The ceramic electronic component of claim 3,
   wherein the bonding layer includes first and second bonding layers, and
   wherein the sintered external electrode includes first and second external electrodes.

5. The ceramic electronic component of claim 4,
   wherein the first and second external electrodes are disposed on the first and second surfaces of the body, respectively, and
   wherein the first and second bonding layers are disposed between the first and second surfaces of the body and the first and second external electrodes, respectively.

6. The ceramic electronic component of claim 5, wherein the first and second external electrodes include copper (Cu) or nickel (Ni).

7. The ceramic electronic component of claim 5, wherein thicknesses of the first and second external electrodes in centers of the first and second surfaces of the body are substantially the same as thicknesses of the first and second external electrodes on ends of the first and second surfaces of the body, respectively, on a cross-sectional surface taken in the length direction and the thickness direction.

8. The ceramic electronic component of claim 5,
   wherein portions of the first and second external electrodes extend to the third to sixth surfaces of the body.

9. The ceramic electronic component of claim 8, wherein the first and second external electrodes include copper (Cu).

10. The ceramic electronic component of claim 8, wherein thicknesses of the first and second external electrodes in centers of the first and second surfaces of the body are substantially the same as thicknesses of the first and second external electrodes on corners on which the first and second surfaces of the body are connected to the fifth or sixth surface, respectively, on a cross-sectional surface taken in the length direction and the thickness direction.

11. The ceramic electronic component of claim 4,
   wherein the first external electrode includes a first electrode layer disposed on the first surface of the body, and a second electrode layer disposed on the first surface of the body, covering the first electrode layer, and having a portion extending to the third to sixth surfaces of the body,
   wherein the second external electrode includes a third electrode layer disposed on the second surface of the body, and a fourth electrode layer disposed on the second surface of the body, covering the third electrode layer, and having a portion extending to the third to sixth surfaces of the body,
   wherein the first bonding layer is disposed in respective regions between the first surface of the body and the first and second electrode layers, and
   wherein the second bonding layer is disposed in respective regions between the second surface of the body and the third and fourth electrode layers.

12. The ceramic electronic component of claim 11,
   wherein each of the first and third electrode layers includes nickel (Ni),
   wherein each of the second and fourth electrode layers includes copper (Cu).

\* \* \* \* \*